United States Patent

Kazmierczak et al.

[19]

[11] Patent Number: 5,880,905
[45] Date of Patent: Mar. 9, 1999

[54] RADIALLY LOADED DISC MOUNTING SYSTEM FOR A DISC DRIVE

[75] Inventors: Frederick Frank Kazmierczak, San Jose; Michael John Raffetto, Scotts Valley, both of Calif.

[73] Assignee: Seagate Technology, Inc., Scotts Valley, Calif.

[21] Appl. No.: 931,347

[22] Filed: Sep. 16, 1997

[51] Int. Cl.$^6$ .................................................. G11B 17/08
[52] U.S. Cl. ............................................................ 360/98.08
[58] Field of Search .............................. 360/98.08, 99.12

[56] References Cited

U.S. PATENT DOCUMENTS 5,659,443  8/1997  Berberich ............................. 360/98.08

*Primary Examiner*—A. J. Heinz
*Attorney, Agent, or Firm*—Edward P. Heller, III; Raghunath S. Minisandram

[57] ABSTRACT

A disc mounting system for mounting the discs of a disc drive in a fixed radial relationship to the hub of a spindle motor. The disc mounting system includes a disc mounting ring associated with each disc in the disc stack. The disc mounting ring includes at least one axially extending finger against which a portion of the inner diameter of the disc is brought to bear in an interference fit. In a first embodiment of the invention, the disc mounting ring includes a single finger and that portion of the inner diameter of the disc radially opposite the finger directly contacts the spindle motor hub. In other embodiments of the invention, the disc mounting ring includes a plurality of fingers spaced circumferentially about the ring and the inner diameter of the disc bears on all fingers and has no direct contact with the spindle motor hub. In all embodiments, it is envisioned that sufficient axial force will be applied to the discs at the time of manufacture to produce some cold-flowing of the disc mounting ring material of the fingers. Mechanisms for controlling the axial location of the discs relative to the spindle motor hub are also disclosed.

10 Claims, 6 Drawing Sheets

RADIALLY LOADED DISC MOUNTING SYSTEM FOR A DISC DRIVE

FIELD OF THE INVENTION

This invention relates generally to the field of hard disc drive data storage devices, and more particularly, but not by way of limitation, to a new system for mounting the discs to the hub of a spindle motor in a disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature- and cleanliness-controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted to the spindle motor in a manner that prevents shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Patents, including U.S. Pat. No. 5,528,434, issued Jun. 18, 1996, U.S. Pat. No. 5,517,376, issued May 14, 1996, U.S. Pat. No. 5,452,157, issued Sep. 19, 1995, U.S. Pat. No. 5,333,080, issued Jul. 26, 1994, U.S. Pat. No. 5,274,517, issued Dec. 28, 1993 and U.S. Pat. No. 5,295,030, issued Mar. 15, 1994, all assigned to the assignee of the present invention and all incorporated herein by reference. In each of these incorporated disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with the industry trend of size reduction in the overall disc drive, the size of various components within the disc drive has also been reduced, including the thickness of the discs. As the discs have grown thinner, the amount of clamping force that can be applied to the discs without causing mechanical distortion of the discs has also fallen. That is, due to inescapable tolerance variation in the flatness of the disc mounting flange on the spindle motor, the discs themselves and the disc spacers between adjacent discs, as well as the yield strength of the disc material, only a finite amount of axial clamping force can be applied to the inner diameters of the discs before the desired flatness of the disc surfaces is lost.

Furthermore, the amount of non-operating mechanical shock which the disc drive is specified to withstand is constantly being increased, with future disc drive products being considered which must be capable of operating after experiencing non-operating mechanical shocks in the range of 1000 G.

In light of these facts, it is clear that the currently common practice of axially loading the disc stack to prevent shifting of the discs relative to the spindle motor hub has nearly reached its maximum useful extreme, and a new system for mounting the discs to the spindle motor hub must be provided.

SUMMARY OF THE INVENTION

The present invention is a disc mounting system for mounting the discs of a disc drive in a fixed radial relationship to the hub of a spindle motor. The disc mounting system includes a disc mounting ring associated with each disc in the disc stack. The disc mounting ring includes at least one axially extending finger against which a portion of the inner diameter of the disc is brought to bear in an interference fit. In a first embodiment of the invention, the disc mounting ring includes a single finger and that portion of the inner diameter of the disc radially opposite the finger directly contacts the spindle motor hub. In other embodiments of the invention, the disc mounting ring includes a plurality of fingers spaced circumferentially about the ring and the inner diameter of the disc bears on all fingers and has no direct contact with the spindle motor hub. In all embodiments, it is envisioned that sufficient axial force will be applied to the discs at the time of manufacture to produce some cold-flowing of the disc mounting ring material of the fingers. Mechanisms for controlling the axial location of the discs relative to the spindle motor hub are also disclosed.

It is an object of the present invention to provide a system for mounting the discs in a disc stack to the hub of a spindle motor used to rotate the discs in a disc drive.

It is another object of the invention to provide a disc mounting system which prevents shifting of the discs relative to the hub of the spindle motor due to differential thermal expansion.

It is another object of the invention to provide a disc mounting system which prevents shifting of the discs relative to the hub of the spindle motor due to the applications of large mechanical shocks.

It is another object of the invention to provide a disc mounting system that is suitable for use in a high volume manufacturing operation.

It is another object of the invention to provide a disc mounting system that can be implemented in a high volume manufacturing operation in an economical manner.

The manner in which these objects are achieved, as well as other features and benefits of the invention, can best be understood by a review of the following DETAILED DESCRIPTION OF THE INVENTION, when read in conjunction with an examination of the accompanying drawings.

BRIEF DESCRIPTION OF THE DRAWINGS

FIGS. 2-1 and 2-2 are simplified sectional elevation views of typical prior art disc mounting systems which utilize only axial loading to secure the discs.

FIGS. 5-1 and 5-2 are simplified sectional elevation views illustrating the mounting of a disc using the disc mounting ring of FIG. 3.

FIGS. 8-1 and 8-2 are simplified sectional elevation views illustrating the mounting of a disc using the disc mounting ring of FIG. 7.

DETAILED DESCRIPTION OF THE INVENTION

Figure 1:
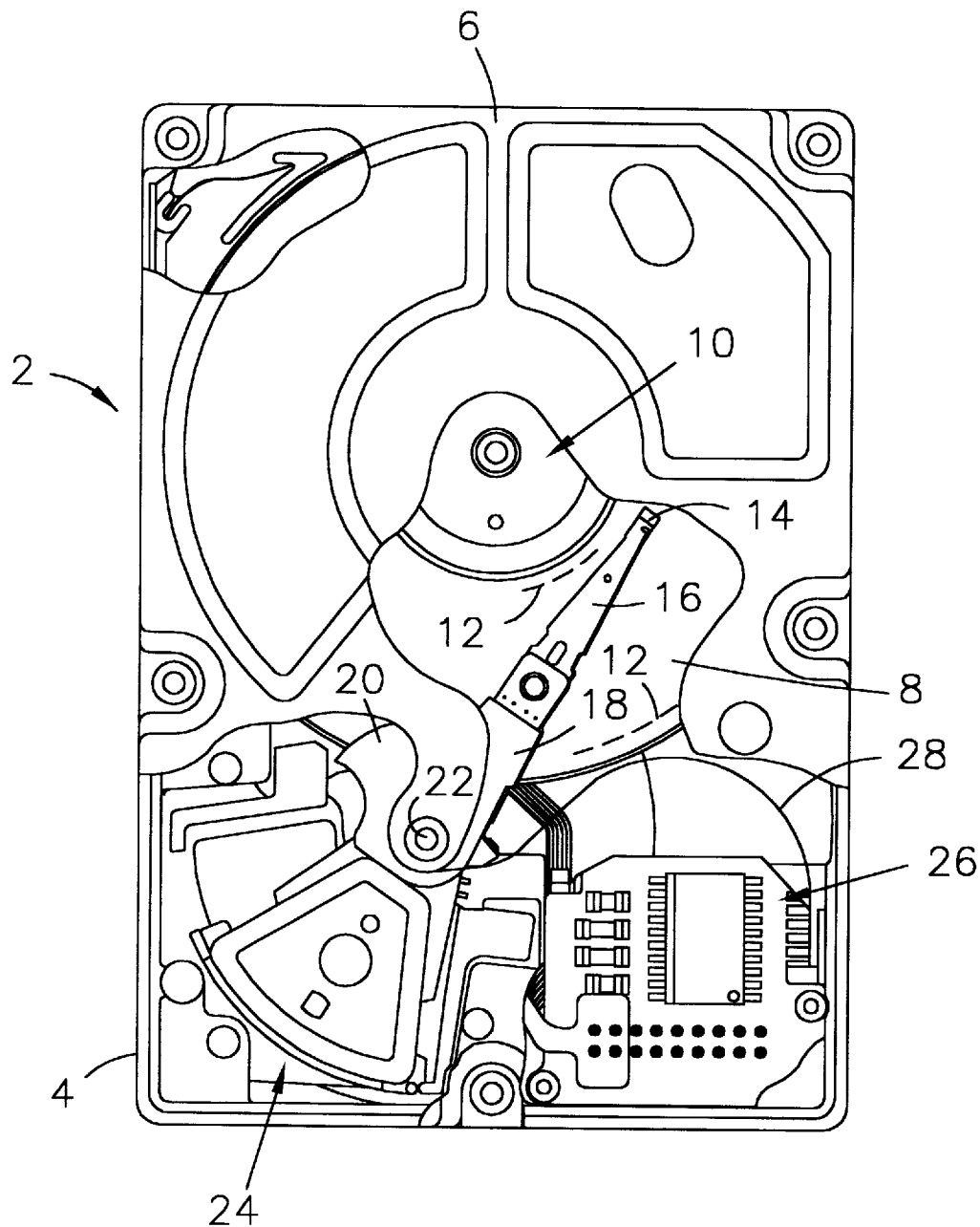
FIG. 1 is a top plan view of a prior art disc drive in which the present invention is particularly useful.

Turning now the drawings and specifically to FIG. 1, shown is a plan view of a disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

Figure 2:
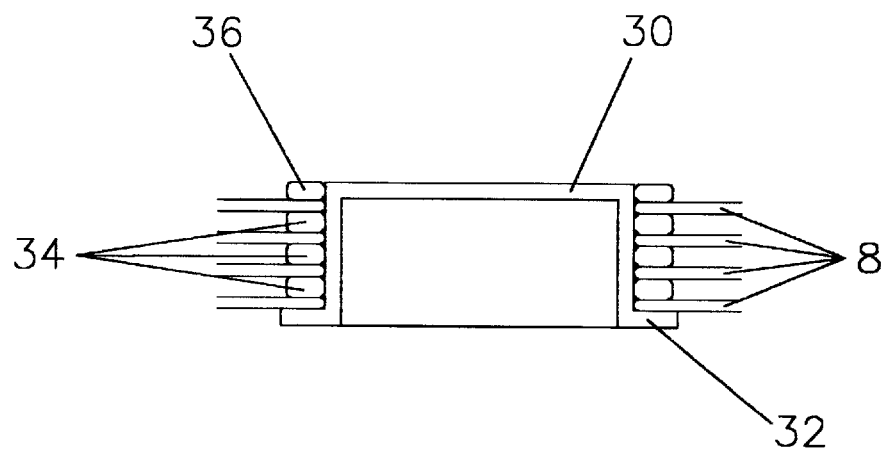
Figure 2:
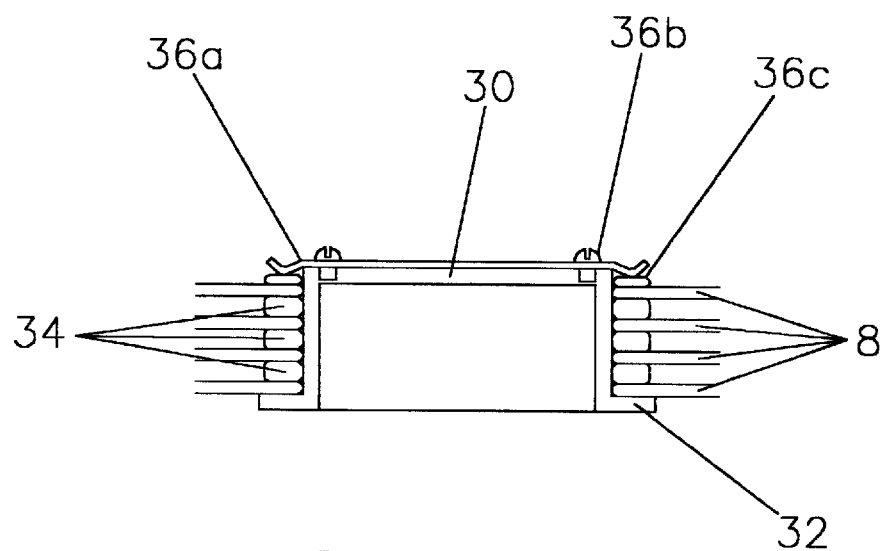

FIG. 2-1 is a simplified sectional elevation view of a typical prior art disc mounting system which utilizes axial loading to secure the discs. The figure shows a hub 30 of a spindle motor having a radially extending disc mounting flange 32 at its lower extreme. The hub 30 is substantially cup-shaped, being closed at the upper end and open at the lower end. The person of skill in the art will appreciate that the electrical and magnetic components (not shown) to rotate the hub 30 would typically be located within the hub.

FIG. 2-1 also shows a plurality of discs 8 and disc spacers 34. The disc stack is assembled by placing a first disc 8 over the hub 30 to rest against the disc mounting flange 32. The stack is formed by then alternately placing disc spacers 34 and discs 8 over the hub until the intended number of discs 8 have been positioned. A disc clamp 36 is then assembled to the uppermost portion of the hub 30 to complete the assembly. While the figure shows an example disc stack which includes four discs, the person of skill in the art will appreciate that the scope of the present invention includes disc stacks having both greater and lesser numbers of discs.

In FIG. 2-1, the disc clamp 36 is of the type referred to in the industry as a "shrink-fit" clamp. Such clamps have an inner diameter that is nominally smaller than the outer diameter of the hub 30. Assembly is accomplished by heating the clamp 36 to cause thermal expansion great enough to allow the clamp 36 to pass over the hub 30. The designed amount of axial loading is then applied to the disc clamp 36 and the clamp 36 is allowed to cool and shrink into interference fit with the hub 30.

Turning now to FIG. 2-2, shown is a simplified diagrammatic sectional elevation view, similar to that of FIG. 2-1, showing a second prior art disc clamping system. FIG. 2-2 shows a spindle motor hub 30 incorporating a disc mounting flange 32 similar to that shown in FIG. 2-1, and a stack of discs 8 and disc spacers 34, also similar to those of FIG. 2-1.

FIG. 2-2 shows a disc clamp 36a of the type known in the industry as a "spring clamp". Such spring disc clamps 36a are typically formed from flat sheet stock having the desired spring characteristics and include circumferential corrugations closely adjacent the outer diameter of the disc clamp which form a contact surface (not designated) for exerting force to the disc stack when a plurality of screws 36b are assembled through the disc clamp 36a into threaded holes (also not designated) in the hub 30. It is also typical for disc clamping systems incorporating such spring disc clamps 36a to include a washer member 36c between the contact surface of the disc clamp 36a and the upper surface of the uppermost disc 8. This washer member 36c aids in evenly distributing the clamping force of the disc clamp 36a about the circumference of the mounting portion of the discs 8 and allows for slip contact between the contact surface of the disc clamp 36a and the washer member 36c when the screws 36b are tightened, thus preventing the exertion of radial stresses directly to the uppermost disc 8.

Selection of the material and geometry of the disc clamp 36a will determine the amount of axial clamping force exerted by the disc clamping system of FIG. 2-2, as will be appreciated by persons of skill in the art. Details of typical disc clamping systems incorporating a spring clamp such as that of FIG. 2-2 can be found in previously incorporated U.S. Pat. Nos. 5,274,517 and 5,295,030.

Both of these two prior art disc clamping systems share a common drawback. Specifically, since the inner diameter of the discs must be at least slightly larger than the outer diameter of the spindle motor hub to allow for assembly ease, the discs are subject to radial displacement relative to the spindle motor hub after assembly due to differential thermal expansion and applied mechanical shocks. And, since all clamping forces applied to the disc stack are in the axial direction, all resistance to such radial shifting of the discs relative to the spindle motor hub is, therefore, purely a function of the amount of applied axial force and the coefficient of friction of the disc stack components. As previously noted hereinabove, with the continuing market trend for higher and higher mechanical shock tolerances, such purely axially loaded disc mounting systems are becoming unsatisfactory.

Figure 3:
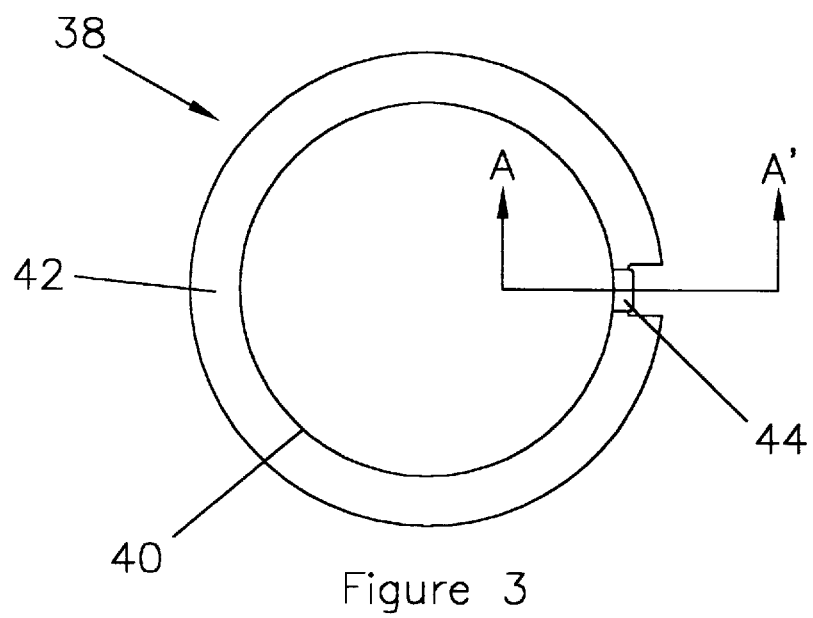
FIG. 3 is a plan view of a disc mounting ring which is a portion of a first embodiment of the present invention.

FIG. 3 is a plan view of a disc mounting ring 38 which is a portion of a first embodiment of the disc mounting system of the present invention. The disc mounting ring 38 has an inner diameter 40 which is functionally larger than the outer diameter of the spindle motor hub with which it is intended for use, as will be discussed in detail below.

Figure 4:
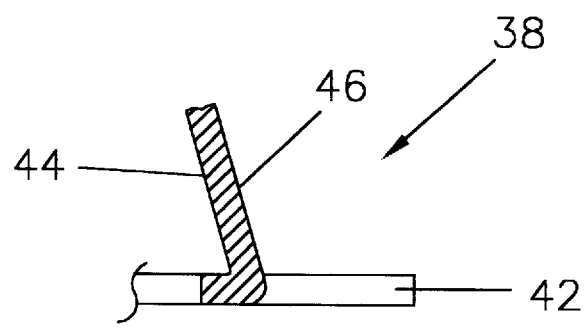
FIG. 4 is a detail sectional view taken along line A-A' of FIG. 3 of a portion of the disc mounting ring of FIG. 3.

The disc mounting ring 38 is currently envisioned as being fabricated from aluminum sheet stock or a suitable engineering plastic, and includes a planar portion 42 and an axially extending finger 44, the exact configuration of which is best seen in FIG. 4.

FIG. 4 is a detail sectional elevation view of a portion of the disc mounting ring 38 taken along line A-A' of FIG. 3. As can be seen in the figure, the finger 44 is bent axially out of plane from the planar portion 42. As currently envisioned, the finger is bent upward at more than a right angle and thus forms a wedge surface 46, which will be the contact surface for the inner diameter of the discs, as will be discussed in detail below.

Figures 1, 5:
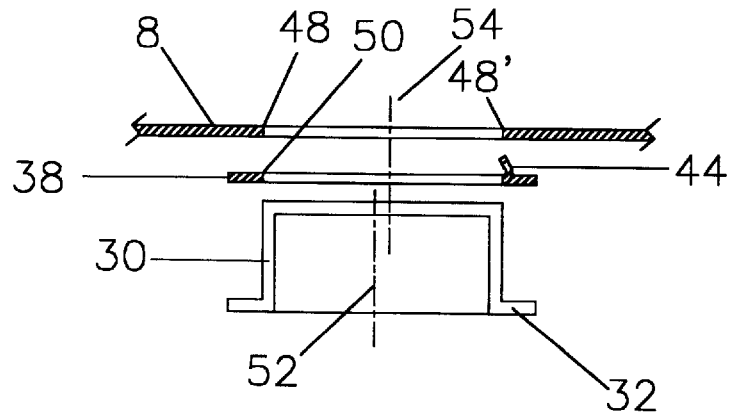
Figures 2, 5:
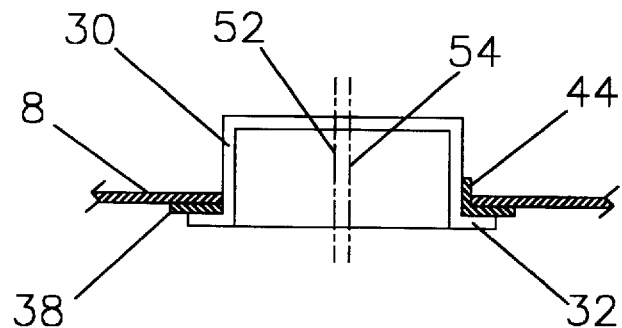

FIGS. 5-1 and 5-2 are simplified sectional elevation views illustrating the mounting of a disc using the disc mounting ring of FIG. 3. Specifically, FIG. 5-1 shows several components of the disc mounting system of the present invention before assembly, while FIG. 5-2 shows the relationship of these components after assembly.

FIG. 5-1 shows a spindle motor hub 30 with a radially extending disc mounting flange 32, similar to the spindle motor hub 30 of prior art FIG. 2, a disc 8 and a disc mounting ring 38 similar to that of FIGS. 3 and 4.

The disc 8 has an inner diameter which is larger than the outer diameter of the spindle motor hub 30, as does the disc mounting ring 38. When assembled onto the spindle motor hub 30, only a single point of the inner diameters of the disc and disc 8 mounting ring 38 will directly contact the spindle motor hub 30 at a location radially opposite finger 44 of the disc mounting ring. These points of contact between the spindle motor hub and the inner diameters of the disc 8 and disc mounting ring 38 are designated with numerical references 48 and 50, respectively, in FIG. 5-1.

Because the inner diameters of the disc 8 and disc mounting ring 38 will directly contact the spindle motor hub 30 only at single points 48, 50, the axial centerline 52 of the spindle motor hub 30 and the axial centerline 54 of the disc 8 and disc mounting ring 38 will be radially offset along a line between the finger 44 of the disc mounting ring 38 and the contact points 48, 50, as shown in the figure. It should be noted, however, that the amount of centerline offset has been exaggerated in the figure for illustrative purposes.

In FIG. 5-2, the components of FIG. 5-1 have been brought into their intended final assembled condition. During assembly, the disc mounting ring 38 is placed over the spindle motor hub 30. Contact between the finger 44 of the disc mounting ring 38 and the spindle motor hub causes the opposite side of the disc mounting ring 38 to directly contact the spindle motor hub at contact point 50.

Simultaneously, the disc 8 is placed over the disc mounting ring with contact point 48 directly contacting the spindle motor hub 30 and a secondary contact point 48' coming to rest against the wedge surface (46 in FIG. 4) of the finger 44 of the disc mounting ring 38.

An assembly tool (not shown) is brought into contact with the innermost portion of the disc 8 and is then driven over the spindle motor hub 30 to force the disc mounting ring 38 and disc 8 downward over the spindle motor hub 30 to the position shown in FIG. 5-2, in which position the disc mounting ring 38 contacts the disc mounting flange 32 and the disc 8 rests atop the disc mounting ring 38. The effect of this press mounting can be best seen in FIG. 6.

Figure 6:
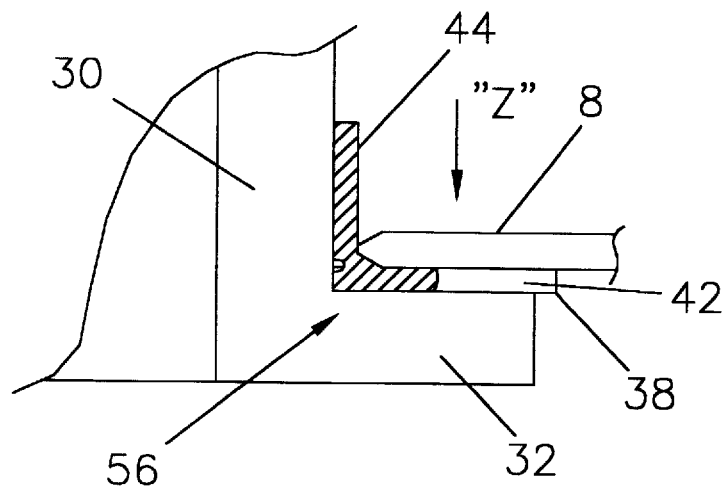
FIG. 6 is a detail sectional view, similar to FIG. 4, showing the final assembled condition of the disc utilizing the disc mounting ring of the first embodiment of the present invention.

FIG. 6 is a detailed sectional view showing the final assembled condition of the disc 8 utilizing the disc mounting ring 38 of FIGS. 3 through 5-2. FIG. 6 shows a portion of the spindle motor hub 30, including the disc mounting flange 32. Once the assembly tool (not shown) has pressed the disc mounting ring 38 and disc 8 into their final assembled positions, the planar portion 42 of the disc mounting ring lies in contact with the upper surface of the disc mounting flange 32 and the disc 8 lies in contact with the upper surface of the planar portion 42 of the disc mounting ring 38.

As currently envisioned, during the assembly process, sufficient pressure is exerted by the assembly tool in the axial direction, that is, in the direction of arrow "Z", to cause cold-flowing of the material of the finger 44 of the disc mounting ring 38 in the area generally designated with numerical reference 56 in FIG. 6. Such cold-flowing results in hard material contact between the spindle motor hub 30, the finger 44 of the disc mounting ring 38 and the disc 8 in the radial direction. Since, as will be recalled from the previous discussion of FIGS. 5-1 and 5-2, the radially opposite side of the disc 8 is drawn into direct contact with the spindle motor hub 30, the cold-flowing of the finger 44 causes the disc 8 to be fixedly located relative to the spindle motor hub 30, and this fixed relationship will be maintained even in the presence of applied mechanical shocks of large magnitude.

One concern of the embodiment of the present invention shown in FIGS. 3 through 6 lies in the previously mentioned offset between the axial centerline of the spindle motor and the axial centerline of the discs and disc mounting rings, as shown in FIGS. 5-1 and 5-2. The presence of such an offset can result in undesirable imbalance in the components of the disc stack, with accompanying excessive wear on the bearings of the spindle motor, "wobble" of the disc stack and unwanted acoustic noise.

Disc drives which incorporate multiple discs can compensate for the imbalance of each disc by ensuring that the location of the fingers of the disc mounting rings are circumferentially distributed about the spindle motor hub. By offsetting the positions of the fingers by an angle dependent on the number of discs, overall balancing of the disc stack can be achieved.

Centering of the discs relative to the spindle motor hub, and thus disc stack balancing, can also be achieved through the implementation of a second embodiment of the present invention, in which the disc mounting ring includes a plurality of fingers.

Figure 7:
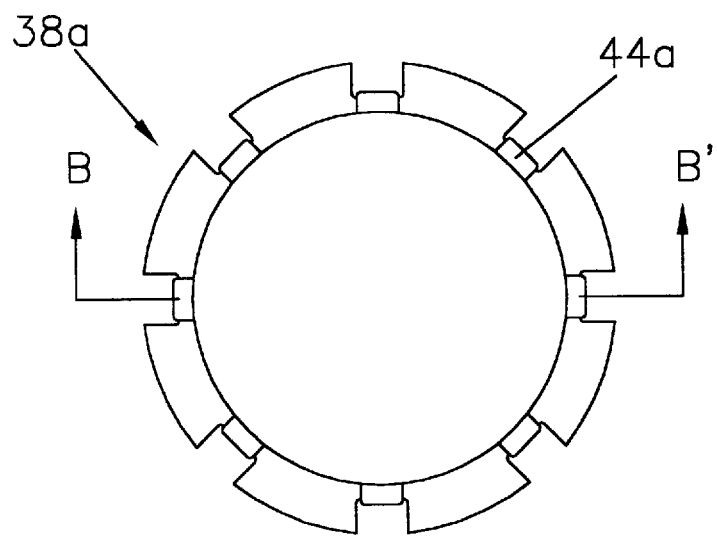
FIG. 7 is a plan view of a disc mounting ring which is a portion of a second embodiment of the present invention.

FIG. 7 is a plan view of a disc mounting ring 38a which is a portion of a second embodiment of the present invention. The disc mounting ring 38a includes 8 axially extending fingers 44a similar to the finger 44 in FIGS. 3 and 4, as an example, but a person of skill in the art will appreciate that differing numbers of fingers can be included in the disc mounting ring without violating the scope of the invention. For instance, two fingers located 180 degrees apart may provide adequate centering of the disc on the spindle motor hub, while three fingers spaced 120 degrees apart would provide even better centering.

A disc mounting ring having eight fingers 44a, such as the disc mounting ring 38a of FIG. 7, would, however, provide more even distribution of radially exerted forces applied to the discs, since each individual finger 44a could be cold-flow formed during assembly to a lesser extent to provide the same degree of radial locking.

Figures 1, 8:
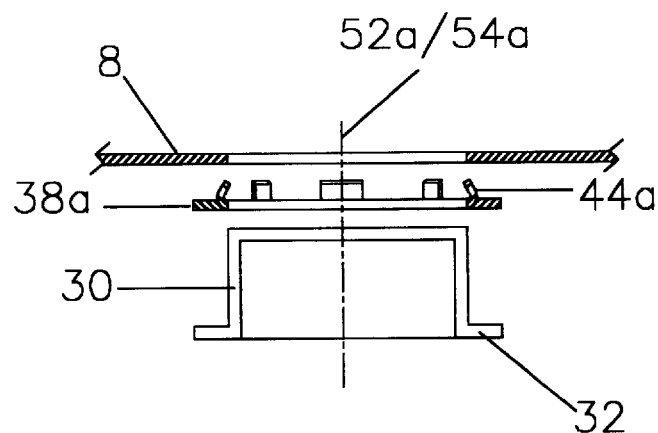
Figures 2, 8:
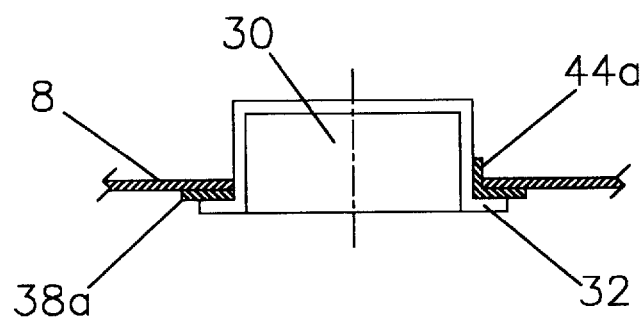

FIGS. 8-1 and 8-2 are simplified sectional elevation views illustrating the mounting of a disc 8 using the disc mounting ring 38a of FIG. 7. In the figures, the disc mounting ring 38a is shown in section along line B-B' in FIG. 7. The figures also show a spindle motor hub 30 having a disc mounting flange 32.

Assembly is accomplished by placing a disc 8 over the disc mounting ring 38a with the inner diameter of the disc contacting the wedge surfaces (46 in FIG. 4) of the fingers 44a. The disc mounting ring 38a and disc 8 are then brought into contact with the spindle motor hub 30, with the inner surfaces of the fingers 44a contacting the hub 30.

An assembly tool (not shown) is then placed in contact with the innermost portion of the disc 8 and pressed downward over the spindle motor hub 30 to drive the disc 8 and disc mounting ring into their assembled position, as shown in FIG. 8-2. Once again, when the disc mounting ring 38a is in its intended assembled position, the planar portion (42 in FIGS. 3 and 4) lies on the disc mounting flange, and the disc lies on the planar portion of the disc mounting ring 38a. Pressing the disc 8 and disc mounting ring 38a to this position causes cold-flowing of the material of the fingers 44a, as was described above in relation to FIG. 6, locking the disc 8 into its intended radial relationship to the spindle motor hub.

Because there are fingers 44a in multiple positions about the circumference of the disc mounting ring 38a, the axial centerline 52a of the spindle motor hub 30 and the axial centerline 54a of the disc 8 and disc mounting ring 38a are coincident, as shown in FIG. 8-1. Thus, the elements of the disc stack are balanced about the spin axis of the spindle motor.

Figure 9:
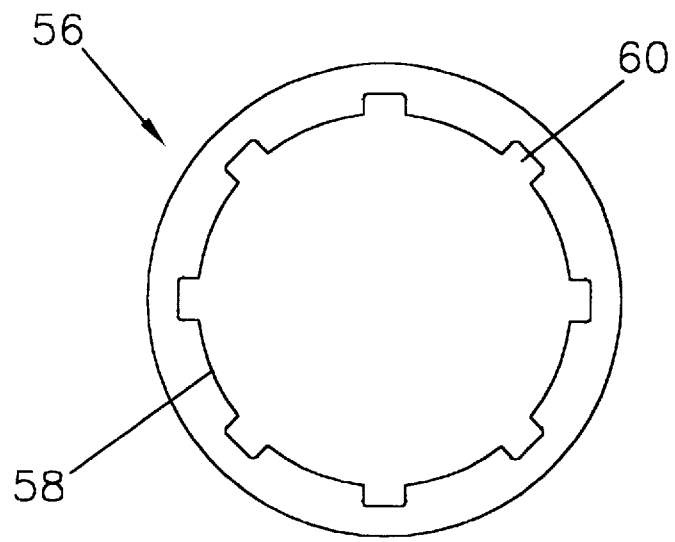
FIG. 9 is a plan view of a disc spacer which is a portion of the disc mounting system of the present invention.

In order to add additional disc stack elements to the spindle motor hub, another disc stack component is required. FIG. 9 is a plan view of a disc spacer 56 which is a portion of the disc mounting system of the present invention. The disc spacer 56 has an inner diameter 58 which is very slightly larger than the outer diameter of the spindle motor hub to allow assembly, and a number of notches 60 extending radially outward from the inner diameter 58. The number of notches 60 is selected to correspond to the number of fingers included on the associated disc mounted ring. In the example disc spacer 56 of FIG. 9, there are eight notches 60, and the disc spacer 56 is intended for use with the example disc mounting ring 38a of FIG. 7. It will be appreciated by a person of skill in the art that the particular number of notches in the disc spacer and fingers on the disc mounting ring will be dependent on design considerations, and should not be considered as limiting to the scope of the present invention.

It is typical for disc spacers to be fabricated from aluminum, but other materials which meet the functional requirements of the disc drive may be substituted without exceeding the scope of the present invention.

Figure 10:
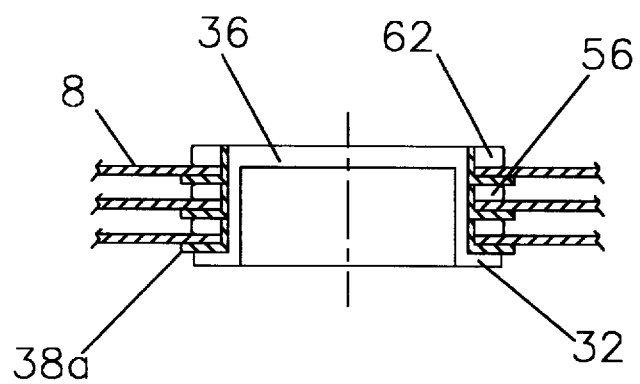
FIG. 10 is a simplified sectional elevation view of a disc stack implemented in accordance with the present invention.

FIG. 10 is a simplified sectional elevation view of a disc stack implemented in accordance with the present invention. The disc stack is assembled on a spindle motor hub 30 which includes a disc mounting flange 32. The lowermost disc is mounted as described above in the discussion of FIG. 8-2. Then a disc spacer 56 is placed over the spindle motor hub 30 and into contact with the upper surface of the lowermost disc. The next combination of disc mounting ring 38a and disc 8 is then pressed onto the spindle motor hub 30 and into contact with the upper surface of the first disc spacer 56. Additional disc spacers 56 and disc/disc mounting ring pairs 8/38a are mounted on the spindle motor hub 30 until the intended disc stack is formed.

Once the topmost disc 8 has been assembled onto the spindle motor hub 30, a disc clamp 62 is attached to the spindle motor hub 30 to prevent axial shifting of the disc stack elements. While the disc clamp 62 of FIG. 10 has a structure similar to the prior art shrink-fit disc clamp 36 of FIG. 2, the disc clamp 62 will include notches (not designated) on its inner diameter, similar to the notches 60 on the inner surface of the disc spacer 56, to accommodate the fingers on the topmost disc mounting ring 38a. The disc clamp utilized with the present invention could also be a spring-type disc clamp. Furthermore the disc clamp 56 has the sole function of maintaining the axial position of the disc stack elements, while maintenance of the radial position of the discs is accomplished by cold-flow forming of the fingers of the disc mounting rings 38a, as was described previously herein. Therefore, the design of the disc clamp 62 is much simpler, and the disc clamp 56 does not have to exert excessive amounts of axial pressure to maintain the radial position of the discs in the presence of applied mechanical shocks.

Again, while the example disc stack shown in FIG. 10 includes three discs, the actual number of discs included in the disc stack should not be considered as limiting to the scope of the present invention.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A disc drive including one or more discs mounted to a hub of a spindle motor and a disc mounting system for mounting the discs to the spindle motor hub comprising:

a radially extending disc mounting flange on the lower end of the spindle motor hub;

a disc mounting ring associated with each disc, the disc mounting ring comprising a planar portion and one or more fingers bent out of plane from the planar portion to extend axially from the planar portion to form a wedge surface; and a disc clamp attached to the upper end of the spindle motor hub for exerting an axial locking force against the discs and the disc mounting flange, each disc being pressed over the spindle motor hub in contact with the wedge surface of the disc mounting ring fingers until the innermost portion of the disc rests on the planar portion of the disc mounting ring and the material of the fingers cold-flows to form contact between the inner diameter of the disc and the spindle motor hub.

2. A disc drive as claimed in claim 1 wherein the disc mounting ring comprises a single finger and wherein each disc directly contacts the spindle motor hub at a contact point radially opposite the finger.

3. A disc drive as claimed in claim 2 wherein the disc drive includes a plurality of discs and the disc mounting system further comprises:

a disc spacer between adjacent disc/disc mounting ring pairs, the disc spacer having an inner diameter slightly larger than the diameter of the spindle motor hub for assembly ease and a notch extending radially outward from the inner diameter to accommodate the finger of the disc mounting ring, wherein the circumferential location of the fingers about the spindle motor hub is separated by an angle dependent on the number of discs to balance the assembly.

4. A disc drive as claimed in claim 1 wherein the disc mounting ring comprises a plurality of fingers and wherein the disc is centered on the spindle motor hub by contact between the inner diameter of the discs and the fingers of the disc mounting ring.

5. A disc drive as claimed in claim 4 wherein the disc drive includes a plurality of discs and further comprises:

a disc spacer between adjacent disc/disc mounting ring pairs, the disc spacer having an inner diameter slightly larger than the diameter of the spindle motor hub for assembly ease and a plurality of notches extending radially outward from the inner diameter to accommodate the fingers of the disc mounting ring.

6. A disc mounting system for mounting one or more discs to a hub of a spindle motor in a disc drive, the disc mounting system comprising:

a radially extending disc mounting flange on the lower end of the spindle motor hub;

a disc mounting ring associated with each disc, the disc mounting ring comprising a planar portion and one or more fingers bent out of plane from the planar portion to extend axially from the planar portion to form a wedge surface; and a disc clamp attached to the upper end of the spindle motor hub for exerting an axial locking force against the discs and the disc mounting flange, each disc being pressed over the spindle motor hub in contact with the wedge surface of the disc mounting ring fingers until the innermost portion of the disc rests on the planar portion of the disc mounting ring and the material of the fingers cold-flows to form contact between the inner diameter of the disc and the spindle motor hub.

7. A disc mounting system as claimed in claim 6 wherein the disc mounting ring comprises a single finger and wherein each disc directly contacts the spindle motor hub at a contact point radially opposite the finger.

8. A disc mounting system as claimed in claim 7 wherein the disc drive includes a plurality of discs and the disc mounting system further comprises:

a disc spacer between adjacent disc/disc mounting ring pairs, the disc spacer having an inner diameter slightly larger than the diameter of the spindle motor hub for assembly ease and a notch extending radially outward from the inner diameter to accommodate the finger of the disc mounting ring, wherein the circumferential location of the fingers about the spindle motor hub is separated by an angle dependent on the number of discs to balance the assembly.

9. A disc mounting system as claimed in claim 6 wherein the disc mounting ring comprises a plurality of fingers and wherein the disc is centered on the spindle motor hub by contact between the inner diameter of the discs and the fingers of the disc mounting ring.

10. A disc mounting system as claimed in claim 9 wherein the disc drive includes a plurality of discs and the disc mounting system further comprises:

a disc spacer between adjacent disc/disc mounting ring pairs, the disc spacer having an inner diameter slightly larger than the diameter of the spindle motor hub for assembly ease and a plurality of notches extending radially outward from the inner diameter to accommodate the fingers of the disc mounting ring.

* * * * *